United States Patent
Usui et al.

(10) Patent No.: US 7,566,845 B2
(45) Date of Patent: Jul. 28, 2009

(54) OVERHEAT PROTECTION CIRCUIT FOR POWER SUPPLY DEVICES AND DIRECT-CURRENT POWER SUPPLY DEVICE

(75) Inventors: Hiroshi Usui, Sakado (JP); Yoichi Kyono, Saitama (JP)

(73) Assignee: Sanken Electric Co., Ltd., Saitama-ken (JP)

( * ) Notice: Subject to any disclaimer, the term of this patent is extended or adjusted under 35 U.S.C. 154(b) by 193 days.

(21) Appl. No.: 11/612,864

(22) Filed: Dec. 19, 2006

(65) Prior Publication Data

US 2007/0139837 A1    Jun. 21, 2007

(30) Foreign Application Priority Data

Dec. 20, 2005   (JP) .............................. 2005-366293

(51) Int. Cl.
H05B 1/02   (2006.01)
(52) U.S. Cl. .................. 219/481; 219/501; 219/497; 219/494
(58) Field of Classification Search ............... 219/481, 219/494, 497, 501, 505, 504
See application file for complete search history.

(56) References Cited

U.S. PATENT DOCUMENTS 7,315,461 B2 *   1/2008   Kyono .................... 363/21.06

FOREIGN PATENT DOCUMENTS

| CN | 1698257 | 11/2005 |
|---|---|---|
| JP | 3-30782 | 3/1991 |
| JP | 5-040064 | 2/1993 |
| JP | 6-117942 | 4/1994 |
| JP | 6-233528 | 8/1994 |
| JP | 7-234162 | 9/1995 |
| JP | 7-297392 | 11/1995 |
| JP | 8-050518 | 2/1996 |
| JP | 8-223023 | 8/1996 |
| JP | 2001-186760 | 7/2001 |
| JP | 2002-101642 | 4/2002 |
| JP | 2002-136123 | 5/2002 |
| JP | 2002-153052 | 5/2002 |
| JP | 2002-209378 | 7/2002 |
| WO | 2004-017507 A1 | 2/2004 |

OTHER PUBLICATIONS

Office Action issued on Mar. 28, 2008 on counterpart Chinese Patent Application No. 200610168018.8.

* cited by examiner

*Primary Examiner*—Mark H Paschall
(74) *Attorney, Agent, or Firm*—Wood, Herron & Evans, L.L.P.

(57) ABSTRACT

In an overheat protection circuit for power supply devices in the present invention, overheat protection is provided by using a Schottky barrier diode (SBD) in place of a dedicated thermosensor. The overheat protection circuit is designed to flow reverse leakage current Ir resulting from temperatures of the SBD thermally coupled with a rectifier diode to a photocoupler inside an output-voltage detecting circuit in a direct-current power supply device. Thereby, where the reverse leakage current of the SBD is increased (where temperatures of the rectifier diode are elevated due to overload), a feedback signal of the output-voltage detecting circuit is increased to decrease the output voltage, thereby the direct-current power supply device is protected from overheat.

5 Claims, 4 Drawing Sheets

OVERHEAT PROTECTION CIRCUIT FOR POWER SUPPLY DEVICES AND DIRECT-CURRENT POWER SUPPLY DEVICE

BACKGROUND OF THE INVENTION

1. Field of the Invention

The present invention relates to an overheat protection circuit for power supply devices and a direct-current power supply device, and in particular relates to an overheat protection circuit for a switching power-supply device (DC-DC converter), and so on.

Priority is claimed on Japanese Patent Application No.2005-366293, filed Dec. 20, 2005, the content of which is incorporated herein by reference.

2. Description of the Related Art

In power supply devices (for example, a switching power-supply device), smoke and ignition which are connected to fire are critical issues that must never arise. As a means for preventing these issues, an overheat protection circuit (overload protection circuit) is often provided.

In most conventional power supply devices, dedicated thermosensors such as thermostats, thermistors and posistors are used to prevent overheating. These components are used in a small number and require elaborate control for temperature so as to be costly, which is a disadvantage. Therefore, in a conventional power supply device disclosed in PCT International Patent Application, Publication No. WO 2004/017507 filed by the present assignee, an inexpensive overheat protection method was proposed in which a Schottky barrier diode (SBD) was used. Hereinafter, a description will be made for the conventional power supply device.

FIG. 4 shows an example of the overheat protection circuit used in the conventional power supply device. In the direct-current power supply device 2 shown in FIG. 4, an alternating-current power supply AC is subjected to rectification and smoothing by using a diode bridge DB1 and a capacitor C1 to obtain a direct-current power supply. The direct-current power supply thus obtained is switched by using a switching element Q1 and applied to a primary winding P of a transformer T.

The transformer T stores magnetic energy when the switching element Q1 is kept on, and releases the stored magnetic energy from a secondary winding S of the transformer T when being kept off. This energy is rectified and smoothed by a rectifier diode D51A and a capacitor C51 and supplied to a load as direct voltage.

The switching element Q1 is subjected to on/off control by a gate control terminal G of a control circuit CONT. A resistor R1 is a starting resistor for starting the control circuit CONT, and charges a capacitor C2 for control power supply to start the control circuit CONT on loading of the AC power supply. When the control circuit CONT is activated, the switching element Q1 starts on and off operations. Thereby, voltage develops at a control winding C of the transformer T, which is rectified and smoothed by a diode D4 and the capacitor C2 to maintain the control power supply of the supply control circuit CONT.

The control circuit CONT is provided with a feedback terminal (FB). Output voltage of a capacitor C51 is detected by an output-voltage detecting circuit 10 including resistors R52, R53, R54, a shunt regulator Z51, a capacitor C52 and a photocoupler PC1 (the photocoupler constituted with a light emitting diode PC1-D and a light receiving transistor PC1-TR), and the error signal is input via the photocoupler PC1 into FB terminals of the control circuit CONT. This error signal provides the switching element Q1 with PWM (pulse width modulation) control, thereby the output voltage is kept constant.

The control circuit CONT is also provided with an overvoltage latch circuit. When the output voltage of the capacitor C51 is in an overvoltage state, the overvoltage is detected by an overvoltage detecting circuit 11 including a zener diode D52, a resistor R51, a photocoupler PC2 (the photocoupler constituted with a light emitting diode PC2-D and a light receiving transistor PC2-TR), and the detected signal is input via the PC2 into an overvoltage detecting terminal (OVP) of the control circuit CONT.

A high-level voltage is applied to the overvoltage detecting terminal (OVP) to set a flip flop inside the control circuit CONT, thereby a drive signal of the switching element Q1 output from a gate control terminal G of the control circuit CONT is blocked. Thereby, the overvoltage latch circuit is activated to block the drive signal of the switching element Q1 making it possible to allow the safe shutdown of a power supply device. Furthermore, the control circuit CONT is able to keep the shutdown by an extremely small flow of electricity supplied from the starting resistor R1.

This type of overheat protection used in the conventional power supply devices is to use reverse leakage current Ir of the SBD D51, activating an overvoltage detecting circuit 11 to shut down a power supply device. For example, the SBD D51B for overheat protection thermally coupled with an output rectifier diode D51A is connected in parallel with respect to an overvoltage detecting zener diode D52.

Thereby, a direct-current power supply device 2 is kept in an overheat state (overload state). When the rectifier diode D51A is heated, the SBD D51B thermally coupled with the D51A is heated up to a similar temperature, thus an increase in reverse leakage current Ir occurs. The reverse leakage current Ir of the D51B flows to the light emitting diode PC2-D of the photocoupler PC2. Thereby, a signal similar to a state of detecting overvoltage into an OVP terminal of the control circuit CONT via a light receiving transistor PC2-TR of the PC2 is inputted to shut down the direct-current power supply device 2.

In the Schottky barrier diode (SBD) D51B, the reverse leakage current Ir at high temperatures is greater than generally-used PN junction diodes. Leakage current is abruptly increased at the junction temperature of approximately 120° C. The Schottky barrier diode (SBD) D51B detects leakage current, thereby making it possible to reliably provide overheat protection before the conventionally-used PN junction-type semiconductors are put into a dangerous state. This circuit can be constituted by adding only one SBD to individual outputs of a power supply device having a plurality of outputs in particular. Therefore, the overheat protection circuit can be installed in each output at a very inexpensive price. Furthermore, the output rectifier diode D51A and the SBD D51B are thermally coupled, and advantageously, they can be formed in an integral manner to make the thermal coupling more dense. These can be easily constituted by using a TO-220 package or a TO-3P package.

As described above, in the overheat protection circuit for the direct-current power supply devices shown in FIG. 4, the reverse leakage current Ir of the SBD D51B is used to activate the overvoltage detecting circuit 11, thereby the direct-current power supply device 2 is shut down.

In the overheat protection circuit shown in FIG. 4, the overvoltage detecting circuit 11 mounted on the secondary side of the transformer T is used to provide overheat protection. In an attempt to constitute a power supply device more inexpensively, overvoltage is often detected on the primary side of a transformer T. Therefore, it has been desired to constitute an overheat protection circuit with a SBD at an inexpensive price, even in a case where no overvoltage detecting circuit 11 is mounted on the secondary side (output side) of the transformer T.

SUMMARY OF THE INVENTION

An object of the present invention is to provide an overheat protection circuit for providing overheat protection by using an inexpensive Schottky barrier diode (SBD) in place of a highly expensive, dedicated thermosensor in a case where no overvoltage detecting circuit is provided on the secondary side (output side) of a transformer.

It is also an object of the present invention is to provide an overheat protection circuit for power supply device and a direct-current power supply device in which the necessity for an expensive photocoupler is eliminated and production costs are reduced.

The present invention provides an overheat protection circuit in which changes in reverse leakage current resulting from temperatures of a Schottky barrier diode (SBD) are detected to protect a power supply device from overheating. A detecting means is provided for detecting changes in reverse leakage current of the SBD in an output feedback circuit for controlling the output of the power supply device to a predetermined voltage or current. When the reverse leakage current of the SBD is increased, the output voltage or output current is decreased via the output feedback circuit. In this way, the output electric power is controlled.

In the above-described constitution, in the case where an SBD is used in place of a dedicated thermosensor to provide overheat protection in an overheat protection circuit for a power supply device, the reverse leakage current of the SBD is detected in the output feedback circuit for adjusting the output to a predetermined voltage or current. Then, when the power supply device is overheated to elevate temperatures detected by the SBD (temperatures of a component inside the power supply device on which the SBD is mounted), and the reverse leakage current of the SBD increases, the output voltage or the output current is decreased.

Thereby, in an output voltage or an output current control power supply device, an output feedback circuit is used to provide overheat protection. Therefore, it is possible to provide an overheat protection circuit in the case where no overvoltage detecting circuit is mounted on the secondary side of a transformer in a switching power-supply device. It is also possible to decrease the number of components to reduce the production costs. For example, it is possible to eliminate the necessity of an expensive photocoupler used in an overvoltage detecting circuit on the secondary side of the transformer and reduce the production costs.

Furthermore, an overheat protection circuit for a power supply device according to one aspect of the present invention is provided with an adder for adding a signal of reverse leakage current of the SBD to a signal for detecting the output voltage or output current of the output feedback circuit. When the reverse leakage current of the SBD is increased, the output voltage or the output current is decreased via the output feedback circuit, thereby the output of electric power is restricted.

In the above-described constitution, a signal of reverse leakage current resulting from the SBD is added to a signal for detecting the output voltage or output current in the feedback circuit. Thereby, temperatures detected by the SBD (temperatures of a component inside the power supply device on which the SBD is mounted) are elevated to increase reverse leakage current of the SBD, thus the same effect as an increased signal for detecting the output voltage or the output current inside the feedback circuit is given. The overheat protection circuit is, therefore, activated to decrease the output voltage or output current of the power supply device.

Thereby, in an output voltage or an output current control in power supply device, the output feedback circuit can be used to provide overheat protection. Therefore, it is possible to provide an overheat protection circuit in the case where no overvoltage detecting circuit is mounted on the secondary side of the transformer in a switching power-supply device, etc., and also decrease the number of components to reduce production costs. For example, it is possible to eliminate the necessity of an expensive photocoupler used in an overvoltage detecting circuit on the secondary side of the transformer and reduce the production cost.

Furthermore, an overheat protection circuit for a power supply device according to another aspect of the present invention is constituted in such a way that the voltage of a control power supply which supplies electric power to a control circuit in the power supply device is approximately proportional to the output voltage during steady operation excluding the start-up time. When the overheat protection circuit detects an overheat state to restrict the output electric power, the voltage of the control power supply is also restricted. Therefore, when the control circuit is restricted for the output electric power, the overheat protection circuit repeatedly halts or repeats start-up and halt operation, thereby overheat of the power supply device is protected.

In the above-described constitution, the voltage of the control power supply decreases with the decrease in output voltage, a control circuit is halted due to insufficient electric power of the control power supply to result in a temporary halt of the power supply device. Thereafter, the control circuit is again started through a predetermined start-up time, by which the power supply device is restarted. In this instance, if the power supply device is restarted to eliminate an overheat state (overload state), the power supply device is operated normally. If the overheat state is not eliminated, the power supply device is again temporarily halted. Thereafter, this operation is repeated.

Thereby, in the case where an output voltage or an output current control power supply device is in an overheat state, an output feedback circuit is used to restrict the output electric power and also the voltage of the control power supply is decreased to temporarily halt the control circuit, thereby making it possible to provide overheat protection. Furthermore, if the overheat state is eliminated, the power supply device can be automatically restarted.

In addition, in an overheat protection circuit for a power supply device according to still another aspect of the present invention, the power supply device includes a transformer having at least a primary winding and a secondary winding in which the primary winding is connected to a direct-current power supply, a switching element connected in series to the primary winding of the transformer and allowing the electric current to flow from the direct-current power supply to the primary winding of the transformer, a rectifying/smoothing circuit connected to the secondary winding of the transformer, and an output feedback circuit for the rectifying/smoothing circuit. That is, the power supply device is a switching power-supply device for performing on/off control to the switching element and adjusting the output voltage or output current to a predetermined value by a feedback signal from the output feedback circuit. The SBD is thermally coupled with a rectifier diode of the smoothing circuit.

In the above-described constitution, the switching elements connected in series to the primary winding of the transformer are controlled on/off and the SBD is arranged so as to be thermally coupled with the rectifier diode of the smoothing circuit (secondary winding) in a switching power-supply device for supplying electric power to the load from the rectifying/smoothing circuit connected to the secondary winding of the transformer. For example, the SBD and the rectifier diode are accommodated into the same package.

Thereby, in an output voltage or an output current control switching power-supply device, it is possible to easily detect an overheat state of the switching power supply device (overload state) and also provide overheat protection by using the output feedback circuit.

Furthermore, the direct-current power supply device of the present invention is a switching power-supply device for outputting a predetermined direct voltage or a predetermined direct current and provided with any one of the overheat protection circuits described above.

In the above constitution, the output voltage or the output current control switching power-supply device is provided with any one of the above-described overheat protection circuits.

Thereby, in the output voltage or the output current control switching power-supply device, the output feedback circuit can be used to provide overheat protection. Therefore, it is possible to provide the overheat protection in the case where no overvoltage detecting circuit is mounted on the secondary side of a transformer. It is also possible to decrease the number of components to be used so as to reduce the production costs. For example, it is possible to eliminate the necessity of an expensive photocoupler used in an overvoltage detecting circuit on the secondary side of the transformer and reduce the production costs.

DETAILED DESCRIPTION OF THE PREFERRED EMBODIMENTS

Figure 1:
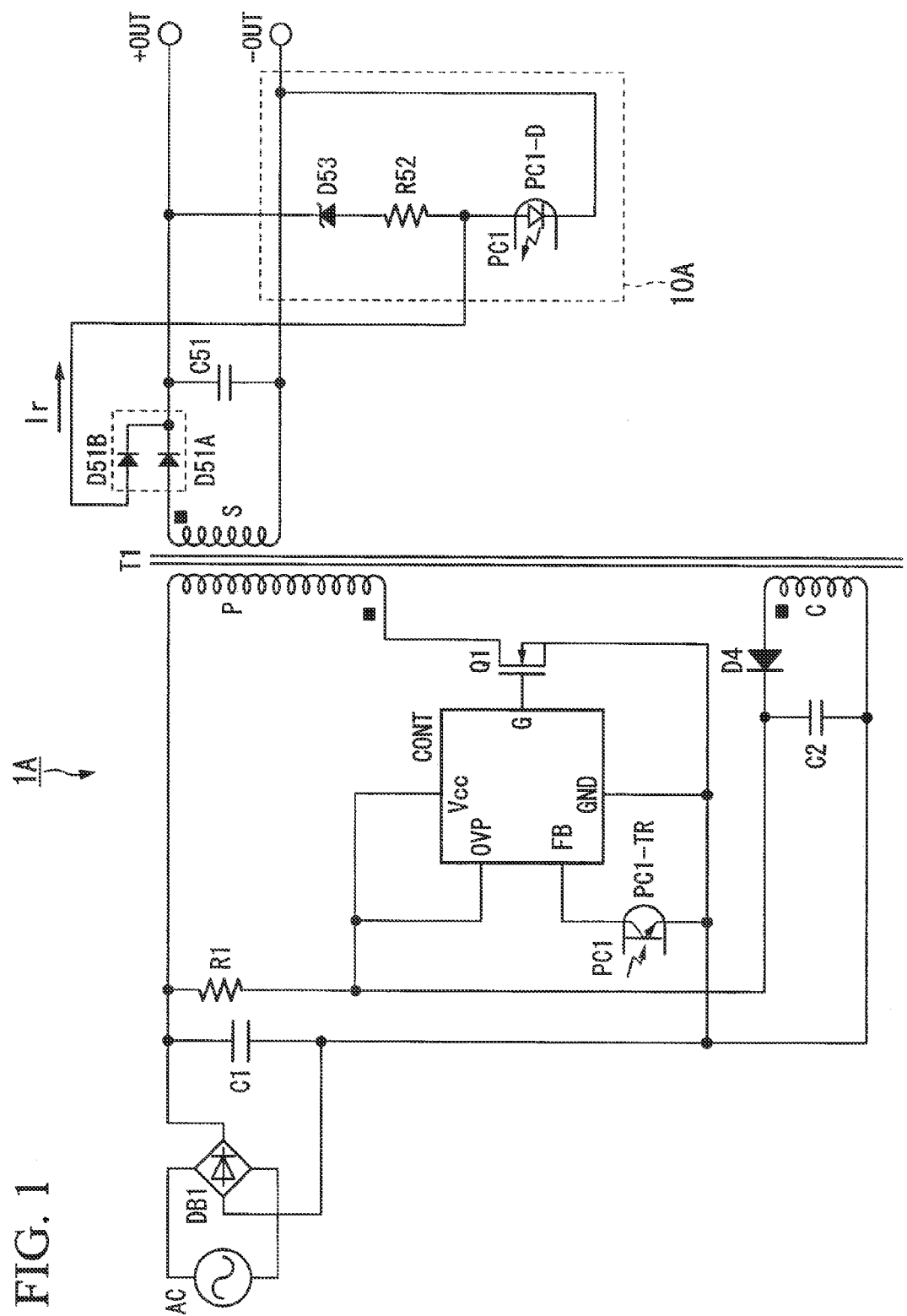
FIG. 1 is a schematic diagram showing a first embodiment of the overheat protection circuit for power supply devices in the present invention.

Next, an description will be made as to the best mode for carrying out the present invention by referring to the drawings.

First Embodiment

FIG. 1 is a view showing a first embodiment of the overheat protection circuit for power supply devices in the present invention, or an example where the present invention is applied to a direct-current power supply device (DC-DC converter) 1A. In a conventional overheat protection circuit shown in FIG. 4, an overvoltage detecting circuit 11 mounted on the secondary side of a transformer T is used to provide overheat protection. In contrast, in the overheat protection circuit 1A shown in FIG. 1, the output-voltage detecting circuit (output-voltage feedback circuit) 10A is used to provide overheat protection.

In an attempt to constitute an inexpensive power supply device, overvoltage is often detected on the primary side of the transformer T. In this embodiment shown in FIG. 1, threshold voltage of an overvoltage detecting terminal OVP of the control circuit CONT on the primary side is used to detect overvoltage of the output voltage. More specifically, by using a rule that output voltage of the secondary winding S of the transformer is approximately proportional to output voltage of the control winding C, the voltage of a control power supply (the control power supply constituted with winding C, diode D4 and capacitor C2) used in the control circuit CONT is detected to detect overvoltage. Therefore, it is possible to eliminate the necessity of the overvoltage detecting circuit 11 on the secondary side of the transformer T and the photocoupler PC2, which are used in the constitution example shown in FIG. 4.

In the overheat protection circuit for direct-current power supply devices 1A shown in FIG. 1, reverse leakage current Ir of a Schottky barrier diode (SBD)D51B for overheat protection is flown into a photocoupler PC1 for constant voltage control.

Thereby, the overheat of a rectifier diode D51A inside the direct-current power supply device 1A results in an increase in reverse leakage current Ir of the SBD D51B thermally coupled with the rectifier diode D51A, by which the reverse leakage current Ir is flown into the photocoupler PC1, and the output voltage is decreased due to the feedback control by an output-voltage detecting circuit 10A.

The output current is also decreased due to a decrease in output voltage, thereby an overheat state is eliminated. Furthermore, depending on loading conditions, the output voltage is greatly decreased, the voltage of a control power supply (control power supply constituted with winding C, diode D4 and capacitor C2) is also greatly decreased, the control circuit CONT is halted due to an insufficient electric power of the control power supply, and the direct-current power supply device 1A is temporarily halted. Thereafter, the control circuit CONT is restarted through the restart time by time constants of a starting resistor R1 and a capacitor C2 for control power supply, thereby the direct-current power supply device 1A is restarted. In this instance, if the direct-current power supply device 1A is restarted to eliminate an overload state, the direct-current power supply device 1A will be normally operated. If the overheat state is not eliminated, the direct-current power supply device 1A is again temporarily halted. Thereafter, this operation is repeated.

Figure 4:
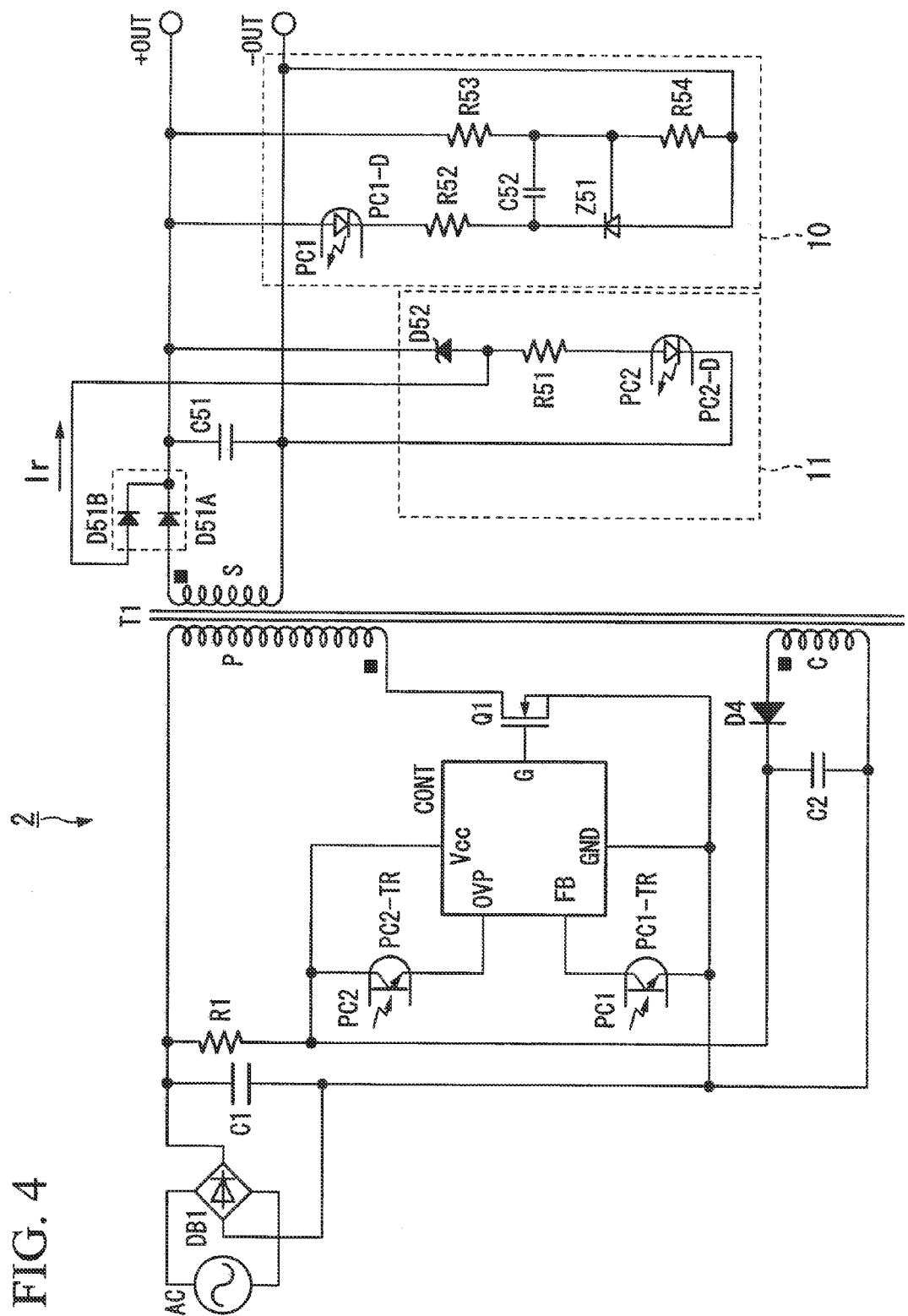
FIG. 4 is a schematic diagram showing an example of an overheat protection circuit for conventional power supply devices.

The power supply device as constituted above provides advantages over the power supply device shown in FIG. 4 in that the direct-current power supply device 1A can be protected from overload in a simple manner even in the case where no voltage detecting circuit is mounted on the secondary side of a transformer.

Second Embodiment

Figure 2:
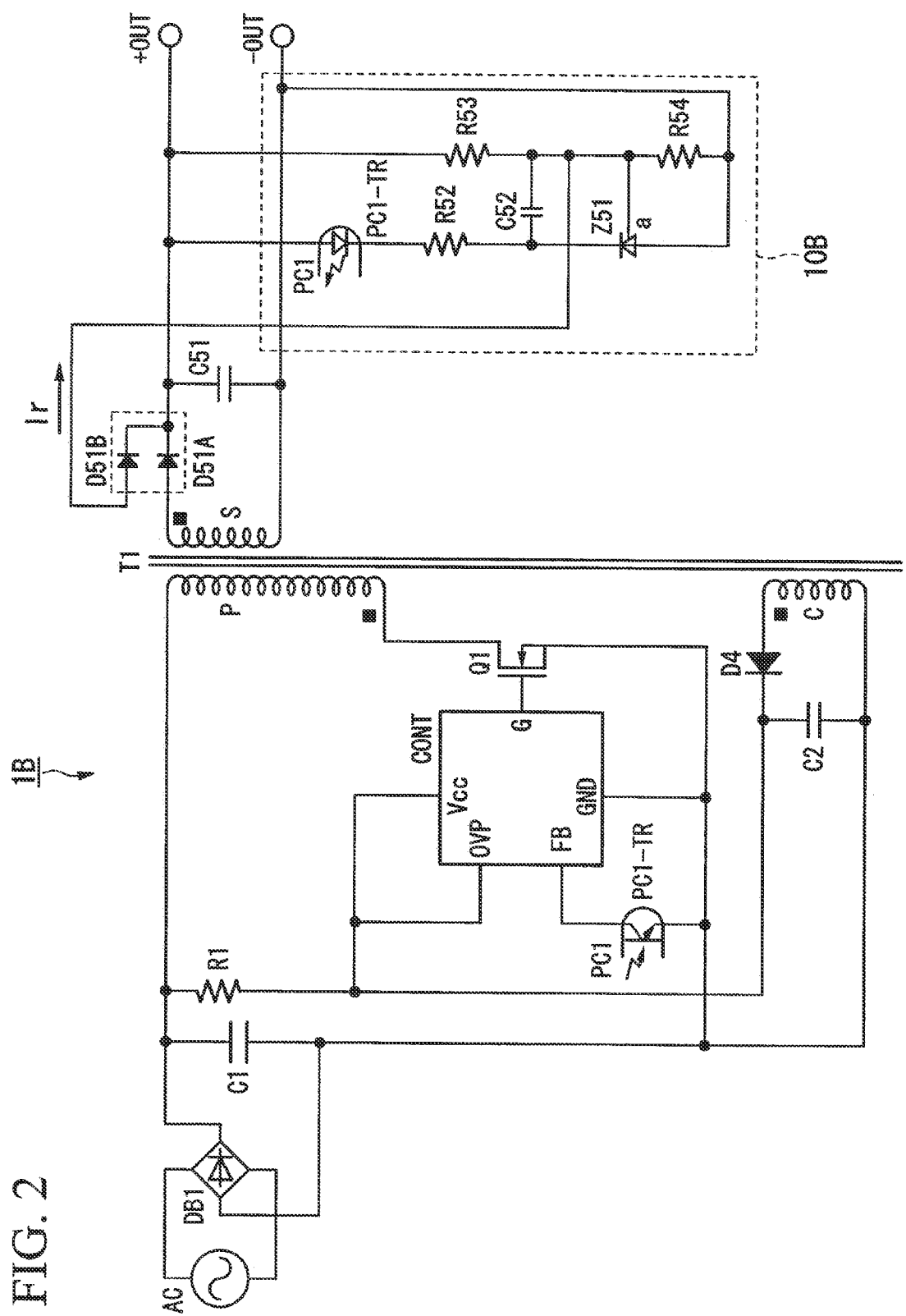
FIG. 2 is a schematic diagram showing a second embodiment of the overheat protection circuit for power supply devices in the present invention.

FIG. 2 is a view showing a second embodiment of the overheat protection circuit for power supply devices in the present invention. The embodiment shown in FIG. 2 is an example in which the present invention is applied to a direct-current power supply device (DC-DC converter) 1B, or an example in which, as with the first embodiment, an output-voltage detecting circuit 10B is used to provide overheat protection.

In the direct-current power supply device 11 shown in FIG. 2, reverse leakage current Ir of the SBD 51B for overheat protection is flown into a reference terminal "a" of a shunt regulator Z51 for constant voltage control inside the output-voltage detecting circuit 10B. Therefore, this power supply device provides advantages over the first embodiment in that overheat protection can be provided at a higher gain.

Third Embodiment

Figure 3:
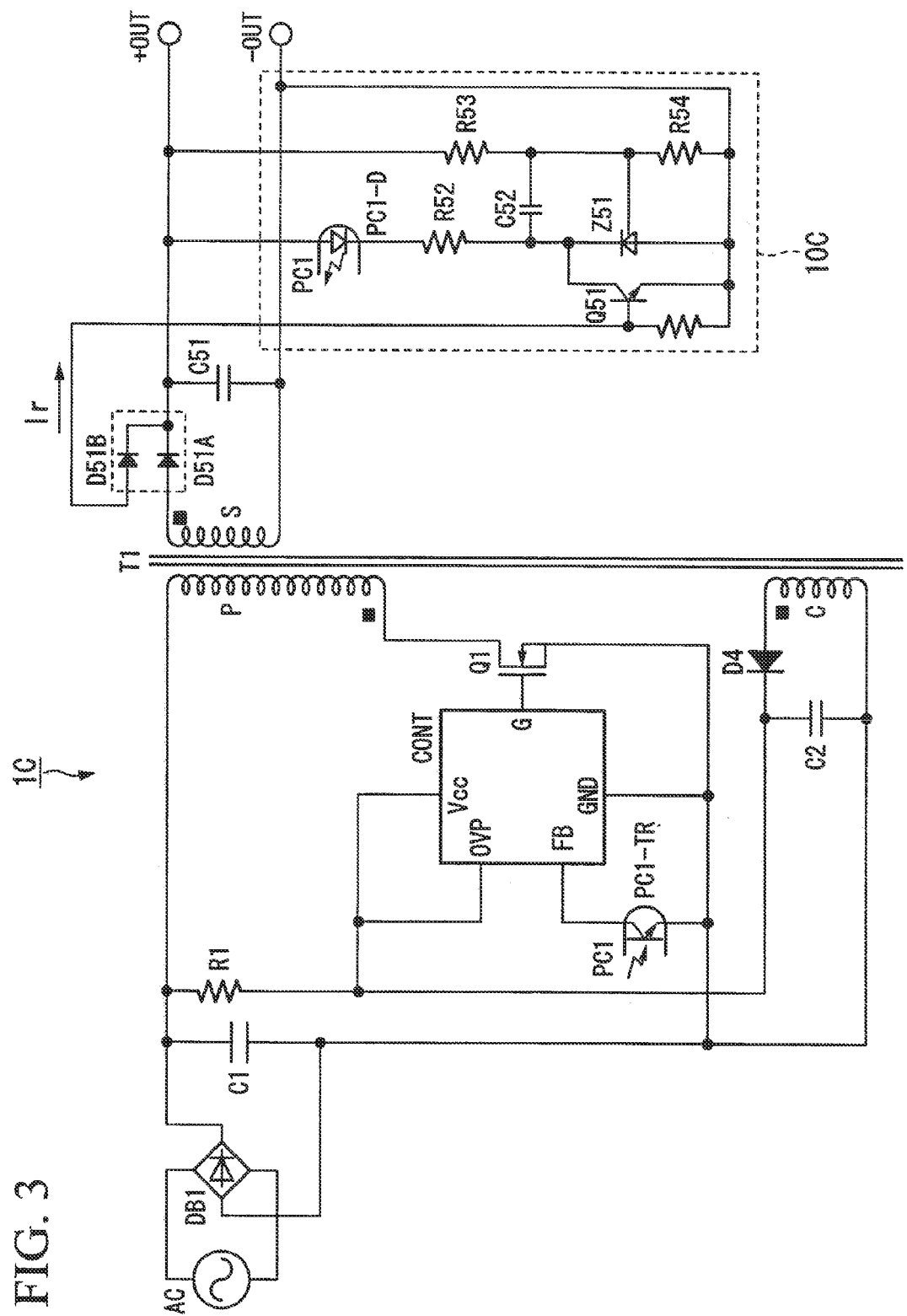
FIG. 3 is a schematic diagram showing a third embodiment of the overheat protection circuit for power supply devices in the present invention.

FIG. 3 is a view showing a third embodiment of the overheat protection circuit for power supply devices in the present invention. The embodiment shown in FIG. 3 is an example in which the present invention is applied to a direct-current power supply device (DC-DC converter) 1C, or an example in which as with the first and second embodiments, an output-voltage detecting circuit 10C is used to provide overheat protection.

The direct-current power supply device IC shown in FIG. 3 is constituted so that reverse leakage current Ir of the SBD D51B for overheat protection is flown to a resistor R between the base and emitter of a transistor Q51 and when the reverse leakage current Ir of the SBD D51B is increased to make the terminal voltage of the resistor R equal to the voltage between the base emitters of the transistor Q51, electric current is flown to base of the transistor Q51 to increase collector current, thereby the electric current flowing to the photocoupler PC1 for constant voltage control is increased. Therefore, this power supply device provides advantages over the first embodiment and the second embodiment in that the reverse leakage current Ir of the SBD D51B during a steady operation state can be ignored and the transistor Q51 is used to provide overheat protection at a higher gain.

As described above, in the present invention, the overheat protection in the case where no overvoltage detecting circuit is mounted on the secondary side of the transformer T is provided in a circuit in which a power supply device is protected from overheating by using an inexpensive SBD in place of a dedicated thermosensor. Furthermore, the power supply device of the present invention is able to eliminate the necessity of an expensive photocoupler PC2, thereby the production costs are reduced, as compared with the conventional power supply device shown in FIG. 4.

Furthermore, the above-described embodiment of the present invention shows a case where the power supply device is a voltage control-type switching power-supply device (DC-DC converter) and a voltage control feedback circuit is used to constitute an overheat protection circuit with the SBD. However, the present invention is not limited thereto and may include a current control-type power supply device in which a feedback circuit for current control is used to constitute an overheat protection circuit with the SBD.

As described above, according to the present invention, in an output voltage control-type power supply device (for example, a switching power-supply device (DC-DC converter), etc.), an output-voltage feedback circuit can be used to provide overheat protection. Therefore, it is possible to decrease the number of used components and reduce the production costs. For example, as compared with the direct-current power supply device shown in FIG. 4, the overheat protection is provided in the case where no overvoltage detecting circuit 11 is mounted on the secondary side of a transformer T. It is also possible to eliminate the necessity of an expensive photocoupler PC2 used on the secondary side of the transformer T and reduce production costs.

The present invention is also applicable to an output current control-type power supply device. In other words, the output-current feedback circuit can be used to provide overheat protection, thereby making it possible to decrease the number of used components and reduce production costs.

A description has been made for the embodiments of the present invention. However, the overheat protection circuit for power supply devices and the direct-current power supply device in the present invention are not limited to the above-described embodiments and it is obvious that these may be modified in various ways within a scope which does not deviate from the spirit of the present invention.

According to the present invention, reverse leakage current resulting from temperatures of the SBD is detected by a voltage controlling and/or a current controlling feedback circuit in a circuit in the case where a power supply device is protected from overheat by using the SBD in place of a dedicated thermosensor to provide overheat protection. Therefore, it is possible to decrease the number of used components and reduce production costs. Thus, the present invention is effectively used in an overheat protection circuit for power supply devices, a direct-current power supply device, and so on.

What is claimed is:

1. An overheat protection circuit for a power supply device which detects changes in reverse leakage current resulting from temperatures of a Schottky barrier diode to provide overheat protection of the power supply device, the overheat protection circuit for power supply device comprising:
   an output feedback circuit for adjusting the output of the power supply device to a predetermined voltage or a predetermined current; and
   a detection portion provided on the output feedback circuit and detecting changes in reverse leakage current of the Schottky barrier diode,
   wherein the output voltage or the output current is decreased to restrict the output electric power via the output feedback circuit when the reverse leakage current of the Schottky barrier diode is increased.

2. The overheat protection circuit for a power supply device according to claim 1, further comprising
   an adding circuit which adds a signal of reverse leakage current of the Schottky barrier diode to a signal of detecting the output voltage or the output current of the output feedback circuit, wherein the output voltage or the output current is decreased via the output feedback circuit when the reverse leakage current of the Schottky barrier diode is increased, so as to restrict the output of electric power.

3. The overheat protection circuit for a power supply device according to claim 1, wherein
   the voltage of a control power supply which supplies electric power to a control circuit inside the power supply device is approximately proportional to the output voltage during a steady operation excluding the start-up time;
   the voltage of the control power supply is restricted when the overheat protection circuit detects an overheat state to restrict the output electric power; and
   the control circuit halts or repeats start up/halt operation to protect the power supply device from overheating when the output electric power is restricted.

4. The overheat protection circuit for a power supply device according to claim 1, wherein the power supply device is a switching power-supply device including:
   a transformer having at least a primary winding and a secondary winding in which the primary winding is connected to a direct-current power supply;

a switching element connected in series to the primary winding of the transformer and allowing the electric current to flow from the direct-current power supply to the primary winding of the transformer;

a rectifying/smoothing circuit connected to the secondary winding of the transformer; and an output feedback circuit for the rectifying/smoothing circuit, the switching power-supply device performing on/off control to the switching element and adjusting the output voltage or output current to a predetermined value by a feedback signal from the output feedback circuit, and the Schottky barrier diode being thermally coupled with a rectifier diode of the smoothing circuit.

5. A direct-current power supply device provided with the overheat protection circuit according to claim 1, wherein the direct-current power supply device is a switching power supply device for outputting a predetermined direct voltage or a predetermined direct current.

* * * * *